(12) United States Patent
Lialiamou et al.

(10) Patent No.: US 8,265,663 B2
(45) Date of Patent: Sep. 11, 2012

(54) MESSAGING SERVICES FOR PRE-PAY USERS

(75) Inventors: Elena Lialiamou, Espoo (FI); Marco Stura, Espoo (FI); Guido Triebel, Espoo (FI)

(73) Assignee: Nokia Corporation, Espoo (FI)

( * ) Notice: Subject to any disclaimer, the term of this patent is extended or adjusted under 35 U.S.C. 154(b) by 2215 days.

(21) Appl. No.: 10/320,745

(22) Filed: Dec. 17, 2002

(65) Prior Publication Data

US 2004/0117312 A1 Jun. 17, 2004

(51) Int. Cl.
*H04W 4/00* (2009.01)
*H04M 11/00* (2006.01)
*G06Q 40/00* (2012.01)

(52) U.S. Cl. ........ 455/466; 455/405; 455/406; 455/408; 705/35; 705/39

(58) Field of Classification Search ............... 705/1, 52, 705/400, 1.1, 35, 39, 40; 455/405, 406, 408, 455/466; 709/206, 209
See application file for complete search history.

(56) References Cited

U.S. PATENT DOCUMENTS

| | | | | |
|---|---|---|---|---|
| 5,625,669 A | * | 4/1997 | McGregor et al. | 455/418 |
| 5,742,668 A | * | 4/1998 | Pepe et al. | 455/415 |
| 6,036,090 A | * | 3/2000 | Rahman et al. | 235/380 |
| 6,094,644 A | * | 7/2000 | Hillson et al. | 705/400 |
| 6,101,378 A | * | 8/2000 | Barabash et al. | 455/406 |
| 6,151,498 A | * | 11/2000 | Roel-Ng et al. | 455/433 |
| 6,169,890 B1 | * | 1/2001 | Vatanen | 455/406 |
| 6,243,450 B1 | * | 6/2001 | Jansen et al. | 379/144.01 |
| 6,335,968 B1 | * | 1/2002 | Malik | 379/114.2 |
| 6,353,852 B1 | * | 3/2002 | Nestoriak et al. | 709/206 |
| 6,404,762 B1 | * | 6/2002 | Luzeski et al. | 370/352 |
| 6,801,781 B1 | * | 10/2004 | Provost et al. | 455/466 |
| 6,856,809 B2 | * | 2/2005 | Fostick | 455/466 |
| 7,177,908 B1 | * | 2/2007 | Chang et al. | 709/206 |
| 7,181,194 B2 | * | 2/2007 | McCann et al. | 455/408 |
| 7,184,530 B2 | * | 2/2007 | Warrier et al. | 379/114.15 |
| 7,215,942 B1 | * | 5/2007 | McQuaide et al. | 455/408 |
| 7,317,929 B1 | * | 1/2008 | El-Fishawy et al. | 455/466 |
| 7,428,510 B2 | * | 9/2008 | Titus et al. | 705/39 |
| 7,590,225 B2 | * | 9/2009 | Sivula | 379/88.13 |
| 7,856,239 B2 | * | 12/2010 | Hosie et al. | 455/466 |
| 7,869,787 B2 | * | 1/2011 | Koskinen et al. | 455/406 |
| 2001/0002927 A1 | * | 6/2001 | Detampel et al. | 379/202 |
| 2001/0029174 A1 | * | 10/2001 | Herajarvi et al. | 455/406 |

(Continued)

FOREIGN PATENT DOCUMENTS

EP 1 136 961 A1 * 9/2001

(Continued)

OTHER PUBLICATIONS

Yi-Bing Lin, Ming-Feng Chang, and Herman Chung-Hwa Rao; "Mobile Prepaid Phone Services"; IEEE; Jun. 2000; pp. 6-14.*

(Continued)

*Primary Examiner* — Ella Colbert
(74) *Attorney, Agent, or Firm* — Ditthavong Mori & Steiner, P.C.

(57) ABSTRACT

A communication system providing messaging services can have a receiving unit configured to receive a request to send a message, an authorization unit configured to authorize the sending of the message in response to the request, and a transmitting unit configured to transmit the authorization to send the message.

30 Claims, 2 Drawing Sheets

U.S. PATENT DOCUMENTS

| | | | |
|---|---|---|---|
| 2001/0040949 A1 * | 11/2001 | Blonder et al. | 379/144.01 |
| 2002/0016748 A1 * | 2/2002 | Emodi et al. | 705/26 |
| 2002/0029189 A1 * | 3/2002 | Titus et al. | 705/39 |
| 2002/0058494 A1 * | 5/2002 | Timonen et al. | 455/405 |
| 2002/0059140 A1 * | 5/2002 | Fahraeus et al. | 705/40 |
| 2002/0098828 A1 * | 7/2002 | Wakil et al. | 455/408 |
| 2002/0173320 A1 * | 11/2002 | Aitken et al. | 455/466 |
| 2003/0037176 A1 | 2/2003 | Schmidt et al. | |

FOREIGN PATENT DOCUMENTS

| | | |
|---|---|---|
| EP | 1 150 262 A2 * | 10/2001 |
| EP | 1 467 300 A1 * | 10/2004 |
| WO | WO 01/22764 | 3/2001 |
| WO | WO 01/48716 * | 7/2001 |

OTHER PUBLICATIONS

Jens Kammann, Thomas Strang, and Kai Wendlandt; "Mobile Services over short range communication"; Aug. 2001; Communications Techniques; pp. 1-5.*

Free Merriam-Webster Dictionary; http://www.merriam-webster.com/dictionary/determine; Date Unknown; pp. 1-3.*

New Media Age; Diane See Morrison: "Mobile learns to pay its way. (Report)."; Mar. 2002; pp. 1-2.*

Communication from European Patent Office, May 26, 2008, 4 pages.

* cited by examiner

MESSAGING SERVICES FOR PRE-PAY USERS

BACKGROUND OF THE INVENTION

Field of the Invention

The present invention relates to messaging services in communication systems, and particularly but not exclusively to multi-media messaging services for pre-pay subscribers in mobile communications system.

In public land mobile networks (PLMN), there are generally two types of subscribers or users of the system: those that are invoiced for the use of services, known as post-pay; and those which pay in advance for the use of services, known as pre-pay.

With pre-pay subscriptions, the cost of using any services are deducted from the pre-paid account as the service is used. Once the pre-paid account is used up, then access to any chargeable services is denied.

Messaging services are one of the services which are available to pre-pay subscribers, and which incur charges. For pre-pay subscribers, therefore, there is a desire to deny access to messaging services when the pre-pay account is empty.

In second generation PLMNs the predominant form of messaging has been the short messaging service (SMS). This type of messaging consists of small messages which are relatively cheap for a subscriber to transmit, and which do not unduly burden the radio resources of the system.

With the transition to third generation PLMNs, the predominant messaging service is likely to become multimedia messaging services. Multimedia messages are considerably larger in size than short messages, and transferred over other bearers. The transmission of multimedia messages will require considerably more network resources than short messages, and consequently will incur more significant charges.

It is likely that some pre-pay subscribers will attempt to send multimedia messages even though their accounts are exhausted or do not have sufficient credit to pay for the charges of the large message. In the current provision of messaging services in PLMNs, it is required for the entire message to be transmitted to the multimedia messaging services centre (MMSC) of the network before the MMSC checks with the charging function as to whether the subscriber has sufficient credit to transmit the message. If the subscriber does not have sufficient credit, then the MMSC drops the message, and does not transmit it.

This technique is acceptable with the current short messaging services, because the size of the messages is small and they do not use up a large amount of radio resources. Similarly the cost of transmitting the messages is small, and a subscriber is more likely to have sufficient credit to transmit the message.

The disadvantage with this technique for multimedia messaging is that the full message is received by the MMSC before it is determined if the pre-pay subscriber has sufficient credit to use the service. This wastes resources if the subscriber does not have sufficient credit to send the message, particularly radio access resources which could be used for other purposes. Furthermore, a subscriber may attempt to repeatedly send the multimedia message, thus repeatedly sending the full message to the MMSC where it is dropped.

It is therefore desirable to provide an improved technique for the handling of messages, particularly multimedia messages, and particularly for pre-pay subscribers.

It is an object of the present invention to provide an improved technique for handling the transmission of messages in communication systems, which addresses one or all of the above-stated problems.

SUMMARY OF THE INVENTION

According to the present invention there is provided a method of controlling the transmission of messages in a communication system comprising: receiving a request for the transmission of a message, the request identifying the message content; determining authorization for the message to be sent in dependence on the request; and transmitting an authorization to send the message content.

The step of determining authorization may include determining a credit level for a subscriber associated with the message. The authorization may be transmitted if the credit level corresponds to the credit required to transmit the message.

The method may further comprise the step of receiving the message content responsive to the authorization. The step of determining authorization may be dependent upon the message content.

The message may be one of a short messaging service, an enhanced messaging service, or a multi-media messaging service. The communication may be a pre-pay or a post-pay mobile communication system.

In a further aspect the present invention provides a method of controlling the transmission of messages in a communication system from a subscriber terminal to a network, the method comprising: transmitting a request for transmission of a message from the subscriber terminal to the network, the request including an identification of the message content; determining an authorization for the message to be sent at the network, said authorization being based on the message content and a credit associated with the subscriber, wherein authorization is granted if the credit is sufficient for the cost of transmitting the message content; transmitting an authorization to send the message content from the network to the subscriber terminal responsive to granting of authorization; and transmitting the message content from the subscriber terminal to the network responsive to said authorization.

The message may be a short messaging service message, an enhanced messaging service message, or a multimedia messaging service message. The communication system may be a mobile communication system.

In a still further aspect there is provided an element for controlling the transmission of messages in a communication network, the element including means for receiving a request identifying the message content, means for determining whether the message is to be sent; and means for providing authorization to send the message.

The element may comprise a message centre. The means for determining whether the message should be sent may include means for determining a credit level for a subscriber associated with the message.

The means for providing authorization may be responsive to the credit level corresponding to a credit level required to transmit the message. The credit level required to transmit the message may be the cost of transmitting the message to be billed to the subscriber.

The credit level required to transmit the message may be dependent upon the message content. The message may be one of a short messaging service, an enhanced messaging service, or a multi-media messaging service. The communication may be a pre-pay or a post-pay mobile communication system.

In a still further aspect the present invention provides a user terminal including means to transmit a request to send a message including an identification of the content of the message, and responsive to an acknowledgement of said request to send the message content.

The message may be one of a short messaging service, an enhanced messaging service, or a multi media messaging service.

The present invention still further provides a communication system including at least one subscriber terminal and a network for connection to the subscriber terminal, the system including: means for transmitting a request for transmission of a message from the subscriber terminal to the network, the request including an identification of the message content; means for determining an authorization for the message to be sent at the network, said authorization being based on the message content and a credit associated with the subscriber, wherein authorization is granted if the credit is sufficient for the cost of transmitting the message content; means for transmitting an authorization to send the message content from the network to the subscriber terminal responsive to granting of authorization; and means for transmitting the message content from the subscriber terminal to the network responsive to said authorization.

The means for determining an authorization may include means for storing a credit level associated with a subscriber and comparison means for comparing the stored credit level to a credit required for transmitting the message content.

The communication system is preferably a mobile telecommunications system.

The invention also provides in a further aspect a computer program product for storing computer program code for performing the method of controlling the transmission of messages in a communication system comprising: receiving a request for the transmission of a message, the request identifying the message content; determining authorization for the message to be sent in dependence on the request; and transmitting an authorization to send the message content.

In embodiments, the invention thus proposes a pre-dialogue between the sending and the receiving entities. This dialogue transfers only the relevant properties of the message to be sent, and gives the network the possibility to prevent the message content being sent, thereby avoiding the uploading of a potentially large message content.

The technique of the present invention protects the PLMN from unnecessary and unpaid data loading in the air interface and thus saves radio capacity for revenue generating services.

BRIEF DESCRIPTION OF THE DRAWINGS

For a better understanding of the present invention and as to how the same can be carried into effect, reference will now be made by way of example to the accompanying drawings in which.

DESCRIPTION OF THE PREFERRED EMBODIMENTS

The present invention is described herein with reference to a particular illustrative embodiment. However, such embodiment is presented for the purposes of illustrating the present invention, and does not limit the scope thereof.

In particular, the present invention is described herein with reference to a particular example of a UMTS network supporting user equipment, such as a mobile station, and providing connections for the user equipment to external IP networks.

The present invention is particularly described herein by way of reference to an example in which a user attempts to transmit a multimedia message. The invention is, however, not limited to multimedia messaging. The invention may apply to any type of messaging, including short messaging services. In this example it is also assumed that the multimedia messaging services center (MMSC) is assigned to a non-dedicated APN (access point name) in a release 5 (or earlier) compliant network. It is further assumed that the users terminal supports HTTP. However the invention is not limited in any way to the particular aspects of the embodiment.

Figure 1:
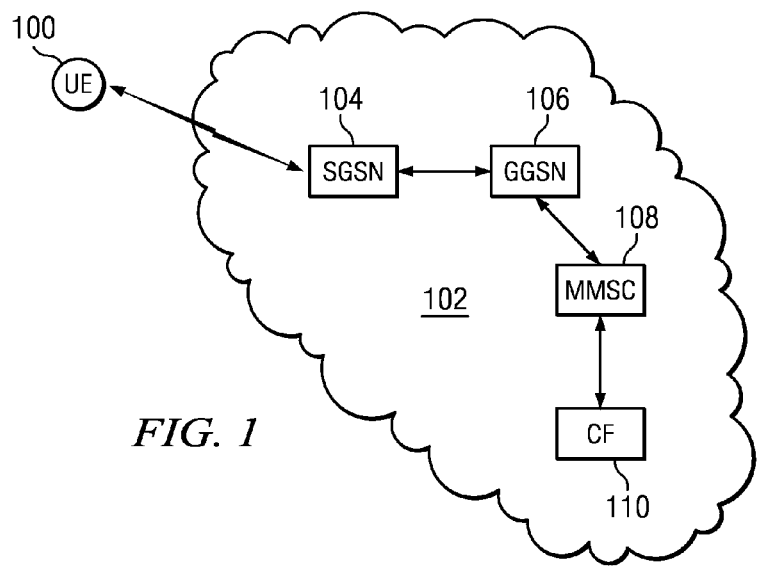
FIG. 1 illustrates the main network elements in an example implementation of the present invention.

Referring to FIG. 1, there is illustrated the main elements of a network for describing the preferred embodiments of the present invention. A user equipment 100 is associated with a user, and interfaces with a mobile communication network 102. The interface between the user equipment 100 and the mobile communication network 102 is via a radio interface. Call sessions for the user equipment 100 into the communication network 102 are via a serving GPRS support node (SGSN) 104. The SGSN 104 is further connected to a gateway GPRS support node (GGSN) 106. The implementation of a mobile communication network, such as a UMTS network, in which an SGSN and a GGSN are utilized will be familiar to one skilled in the art. As such a detailed implementation of such a network is not given in FIG. 1. Rather FIG. 1 is intended to convey sufficient information about the operation of the network 102 for an understanding of the present invention.

The GGSN 106 further communicates with a multimedia messaging services center (MMSC) 108. The MMSC 108 further communicates with a charging function (CF) 110.

In principle, the charging policy in the GGSN 106 for the specific PDP context established between the user equipment 100, the SGSN 104, and the GGSN 106 should indicate the MMSC destination IP address and port. The charging function 110 provides charging for any messaging service provided by the MMSC 108. The charging function 110 mainly includes charging for online and offline. The charging function 110 also supports charging for both post-pay and pre-pay functions.

Figure 2:
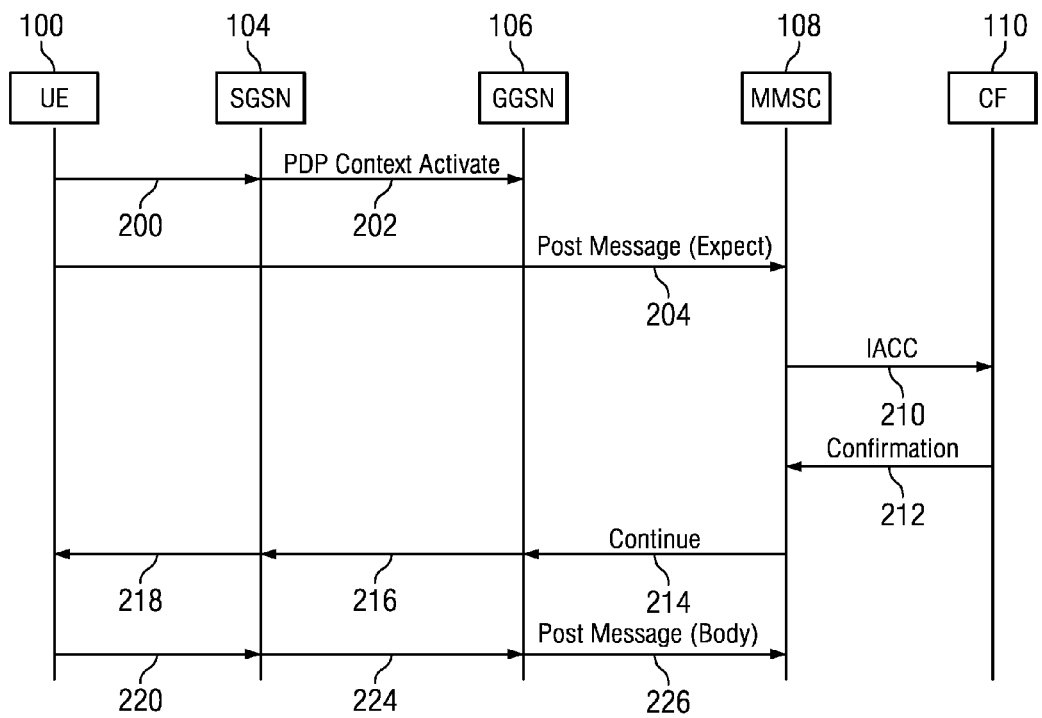
FIG. 2 illustrates the signaling in a preferred embodiment of the present invention.
Figure 3:
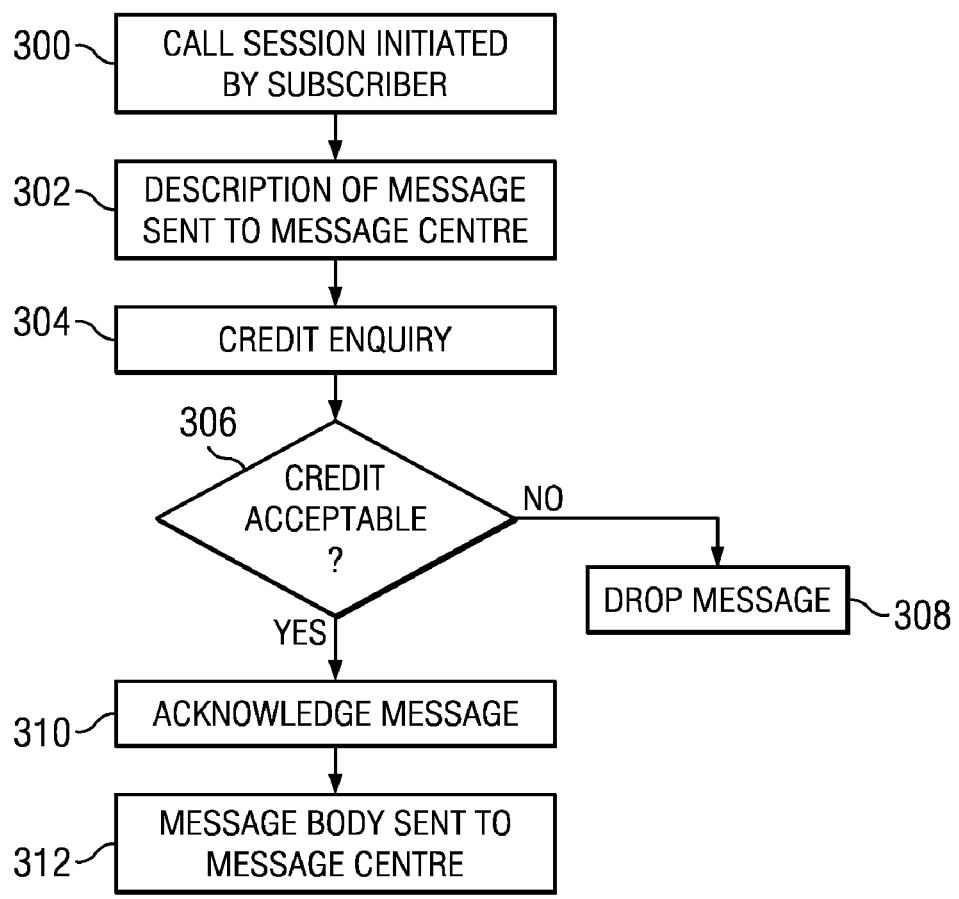
FIG. 3 is a flow chart illustrating the principle steps in implementing the preferred embodiment of FIG. 2.

A preferred embodiment of the present invention, utilizing the network scenario FIG. 1, is now described further with reference to FIGS. 2 and 3.

Referring to FIG. 3, in a step 300 a call session is initiated by the subscriber associated with the user equipment 100. A PDP context is requested, as illustrated by a message 200 in FIG. 2. The SGSN 104 receives a PDP request from the user equipment 100, and forwards a PDP context activate 202 to the GGSN 106.

The PDP context has already been fully established at this stage, shortly prior to sending the message. Therefore the appropriate PDP signals are returned by the GGSN and the SGSN towards the user equipment 100.

In a step 302, and in accordance with the present invention, the user equipment 100 forwards a description of the message to be sent to the MMSC 108. This description is forwarded directly to the MMSC 108 in a message 204, as shown in FIG. 2. In the preferred embodiment this message is a "post-message". However it is not a post-message as is known in the art. For the purposes of this description, the description of the message which is sent to the MMSC 108 is a "post-message with expect". The message 208 is preferably a HTTP post-message, which includes in it the HTTP-specific "100—continue" expectation. Advantageously, this message is small in size and does not load the radio access network because it does not contain the message content.

Responsive to receipt of the post-message 208, the MMSC 108 carries out a credit enquiry in step 304. The MMSC initiates an IACC (In Advance Credit Check) or diameter accounting, indicating the service parameters. This accounting request is forwarded to the charging function 110 as a message 210. The indication of the service parameters may, for example, include the message size and the user identification. Upon receiving the accounting request, the charging function 110 determines the price of the service, performs a credit check and mini reservation, and acknowledges the accounting request to the MMSC 108. In dependence on the credit check carried out, the charging function 110 will instruct the MMSC 108 to either drop or accept the message.

In an alternative, when the charging function 110 identifies that a subscriber has no credit, it may notify the MMSC of the IP address of such subscriber, and the IP address of that subscriber may be 'blocked' in the GGSN 106, to prevent messages going through.

If the charging function 110 determines that there is not sufficient credit available for a pre-pay user to transmit the identified message, then on receipt of this information the MMSC 108 drops the message. This way, in accordance with the present invention, the message content is not transferred across the radio interface or internally within the communications network if the user does not have sufficient credit to pay for the use of the resources.

If the charging function 110 determines that the user does have sufficient credit to transfer the message, then a confirmation message 212 is returned to the MMSC 108. Responsive thereto, the MMSC 108 returns a confirmation message to the user, preferably as a "100-continue" message 214 to the GGSN 106, which in turn is forwarded to the SGSN 104 as message 216, and which finally in turn forwards the message 218 to the user equipment 100.

The steps of determining whether the credit of the user equipment is acceptable, carried out in the charging function 110, are illustrated by steps 306 and 308 in FIG. 3. If a decision is made that the credit is acceptable in step 306, then the procedure moves on to step 310 and the acknowledged message is forwarded to the MMSC 108. If a decision is made that the credit is not acceptable, then the message is dropped in a step 308.

Responsive to receipt of the continue message 218, which indicates to the user equipment 100 that the message may be transmitted, the user equipment 100 transmits or sends the post-message including the message content 220 to the SGSN 104, which in turn forwards a message 224 to the GGSN 106, and which in turn forwards the posted message including the message content 226 to the MMSC 108. The MMSC 108 then takes care of the processing of the message in accordance with known techniques. This is illustrated by step 312 in FIG. 3.

Upon successful delivery of the multimedia message to the destination the MMSC 108 will notify successful delivery to the charging function 110, which will deduct the reserved amount of money from the user's pre-paid account.

Thus the present invention prevents the transmittal of messages over the radio interface or through the communications network where the user sending the message does not have sufficient credit in order to pay for the transmission of the message. The invention is particularly advantageous when used in scenarios where messages are of a large size. As such the invention is particularly advantageous in multimedia messaging applications.

Although in the above embodiment hypertext transfer protocol (HTTP) is used to send a message, the concept is applicable also to other protocols. For example the concept of the present invention is applicable to session initiation protocol (SIP). A preferred embodiment of the present invention also assumes that the sender of the message is responsible for paying the costs in transmitting the message, or at least part of those costs.

The present invention has been described herein with reference to a particular exemplary embodiment. One skilled in the art will appreciate that the invention is not limited in its applicability to such a preferred embodiment. Further modifications and variations to the invention will be apparent to one skilled in the art. The scope of the invention is defined by the appended claims.

The invention claimed is:

1. A method, comprising:
   receiving a request from user equipment to send a message, wherein the request identifies a content of the message;
   determining an authorization for the received request to send the message; and
   causing, at least in part, a transmission of the authorization to the user equipment to send the content of the message.

2. The method of claim 1, wherein the determining of the authorization comprises:
   determining a credit level for a subscriber associated with the message.

3. The method of claim 2, wherein the transmission of the authorization comprises:
   causing, at least in part, a transmission of the authorization where the credit is sufficient for the cost of transmitting the message content.

4. The method of claim 1, further comprising:
   receiving the content of the message in response to the authorization.

5. The method of claim 1, wherein the determining of the authorization is dependent upon an identification of the content of the message.

6. The method of claim 1, wherein the message comprises a short messaging service message, an enhanced messaging service message, or a multi-media messaging service message.

7. The method of claim 1, wherein the receiving of the request comprises:
   receiving the request to send the message in a pre-pay or a post-pay mobile communication system.

8. The method of claim 1, wherein the determining of the authorization for the request to send the message comprises causing, at least in part, a sending of an accounting request to a charging function.

9. The method of claim 8, further comprising: receiving a response to said accounting request and using that response in the determining an authorization for the request.

10. A method comprising:
    causing, at least in part, a transmission of a request to send a message from a subscriber terminal to a network, wherein the request includes an identification of a content of the message;
    determining an authorization at the network for the request to send the message, said authorization being based on the identification of the content of the message and a credit level associated with the subscriber;
    causing, at least in part, a transmission of the authorization to send the content of the message from the network to the subscriber terminal when the credit level equals to or is greater than a cost associated with sending the message; and causing, at least in part, sending the content of the message from the subscriber terminal to the network when the authorization is transmitted.

11. The method according to claim 10, wherein the transmission of the request comprises the step of:

causing, at least in part, a transmission of the request to send a short messaging service message, an enhanced messaging service message, or a multimedia messaging service message.

12. The method according to claim 10, wherein the transmission of the request comprises the step of:

causing, at least in part, a transmission of the request to send a message in a mobile communication system.

13. The method of claim 10, further comprising:

causing, at least in part, storage of a credit level associated with the subscriber; and causing, at least in part, a comparison of the credit level with a predetermined credit associated with sending the content of the message.

14. A system, comprising:

a receiver configured to receive a request from user equipment identifying a content of a message;

a processor configured to authorize the sending of the message in response to the received request; and a transmitter configured to transmit the authorization to the user equipment to send the content of the message.

15. The system of claim 14, wherein the receiving unit comprises a message center.

16. The system of claim 14, wherein the authorization further determines a credit level for a subscriber associated with the message.

17. The system of claim 16 wherein the authorization unit is configured to authorize the sending of the message in response to the request when the credit level corresponds to a predetermined credit level required to send the message.

18. The system of claim 17, wherein the authorization unit is configured to authorize the sending of the message in response to the request when the credit level corresponds to a cost associated with sending the message to be billed to the subscriber.

19. The system of claim 17, wherein the predetermined credit level required to send the message corresponds to the content of the message.

20. The system of claim 14, wherein the message comprises a short messaging service message, an enhanced messaging service message, or a multi-media messaging service message.

21. The system of claim 14, wherein the receiving unit receives the request in a pre-pay or a post-pay mobile communication system.

22. The system of claim 14, wherein the transmitting unit is configured to transmit the authorization to send the message based on an identification of the message.

23. The system of claim 14, further comprising: a charging unit configured to receive an accounting request from the processor.

24. An apparatus comprising:

at least one processor; and at least one memory including computer program code for one or more programs, the at least one memory and the computer program code configured to, with the at least one processor, cause the apparatus to perform at least the following, cause, at least in part, a transmission of a request to send a message, said message including an identification of a content of the message; and receive an acknowledgement of the request to send the content of the message.

25. The apparatus according to claim 24, wherein the message comprises a short messaging service message, an enhanced messaging service message, or a multimedia messaging service message.

26. A non-transitory computer-readable storage medium carrying one or more sequences of one or more instructions which, when executed by one or more processors, cause an apparatus to at least perform the following:

receive a request from user equipment to send a message, the request including an identification of a content of the message;

determine an authorization to send the message in response to the received request; and cause, at least in part, a transmission of the authorization to the user equipment to send the content of the message.

27. An apparatus, comprising:

at least one processor; and at least one memory including computer program code for one or more programs, the at least one memory and the computer program code configured to, with the at least one processor, cause the apparatus to perform at least the following, receive a request from user equipment to send a message, wherein the request comprises an identification of a content of the message;

authorize sending of the message in response to the received request; and cause, at least in part, a transmission of the authorization to the user equipment to send the content of the message.

28. The apparatus of claim 27, wherein the apparatus is further caused, at least in part, to:

cause, at least in part, a granting of the authorization when a credit level corresponds to a predetermined credit level required to transmit the message and the predetermined credit level required to transmit the message corresponds to the content of the message.

29. The apparatus of claim 27, wherein the message comprises a short messaging service message, an enhanced messaging service message or a multi-media messaging service message.

30. The apparatus of claim 27, wherein the receiver receives the request in a pre-pay or a post-pay mobile communication system.

* * * * *